United States Patent
Kumar et al.

(10) Patent No.: US 7,239,721 B1
(45) Date of Patent: Jul. 3, 2007

(54) ADAPTIVE MOTION ESTIMATION

(75) Inventors: Roger Kumar, San Francisco, CA (US); Thomas Pun, Sunnyvale, CA (US); Xiaochun Nie, Cupertino, CA (US); Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 768 days.

(21) Appl. No.: 10/427,891

(22) Filed: Apr. 30, 2003

Related U.S. Application Data

(60) Provisional application No. 60/395,964, filed on Jul. 14, 2002, provisional application No. 60/395,965, filed on Jul. 14, 2002.

(51) Int. Cl.
*G06K 9/00* (2006.01)

(52) U.S. Cl. ...................... 382/107; 382/236

(58) Field of Classification Search ................ 382/107, 382/236, 238–240; 375/240.16; 348/154, 348/155
See application file for complete search history.

(56) References Cited

U.S. PATENT DOCUMENTS

| | | | |
|---|---|---|---|
| 5,200,820 A * | 4/1993 | Gharavi ................ | 375/240.12 |
| 5,488,419 A | 1/1996 | Hui et al. | |
| 5,706,059 A * | 1/1998 | Ran et al. .................... | 348/699 |
| 5,731,850 A | 3/1998 | Maturi et al. | |
| 5,757,668 A | 5/1998 | Zhu | |
| 5,872,604 A | 2/1999 | Ogura | |
| 5,929,940 A * | 7/1999 | Jeannin ...................... | 348/699 |
| 6,014,181 A * | 1/2000 | Sun ............................. | 348/699 |
| 6,212,237 B1 | 4/2001 | Minami et al. | |
| 6,289,050 B1 | 9/2001 | Ohtani et al. | |
| 6,363,117 B1 * | 3/2002 | Kok ....................... | 375/240.24 |
| 6,876,703 B2 * | 4/2005 | Ismaeil et al. ......... | 375/240.16 |
| 6,895,361 B2 | 5/2005 | Yang | |
| 6,947,603 B2 | 9/2005 | Kim | |
| 2001/0019586 A1 | 9/2001 | Kang et al. | |

OTHER PUBLICATIONS

Turaga, et al. "Search algorithms for block-matching in motion estimation", pp. 1-14, 1998.*
U.S. Appl. No. 10/427,890, filed Apr. 30, 2003, Roger Kumar.

* cited by examiner

*Primary Examiner*—Daniel Miriam
(74) *Attorney, Agent, or Firm*—Adeli Law Group

(57) ABSTRACT

Some embodiments of the invention provide a method of performing motion estimation for an array of image values obtained from a current image. The method starts with an initial estimate of the motion of the current image. The method then determines whether the initial estimate of the motion of the current image array between the current image and a reference image is acceptable. If not, the method specifies a first value for a parameter for performing the motion estimation. Otherwise, the method specifies a second value for the parameter. The method then performs a motion estimation operation based on the specified value of the parameter. One example of a specified parameter is the size of the window that the motion estimation operation uses. Another example is the starting level for a hierarchical motion estimation operation that it performs. A hierarchical motion estimation operation searches the reference frame at several different levels of granularity.

29 Claims, 6 Drawing Sheets

ADAPTIVE MOTION ESTIMATION

CLAIM OF BENEFIT TO PRIOR APPLICATION

This patent application claims the benefit of the U.S. Provisional Patent Application 60/395,964, filed Jul. 14, 2002, and U.S. Provisional Patent Application 60/395,965, filed Jul. 14, 2002. Both these provisional applications are incorporated herein by reference.

FIELD OF THE INVENTION

The present invention is directed towards a method for adaptively performing motion estimation.

BACKGROUND OF THE INVENTION

A motion estimator in an MPEG encoding scheme tries to identify a motion vector that specifies the difference in position of an image block in two different image frames. These two frames are a reference frame and a current frame. There are a variety of different motion estimation techniques. For instance, some motion estimators use a predicted motion vector to start their analysis, while others do not.

Also, some motion estimators are hierarchical in nature while others are not. Hierarchical motion estimators use coarse searches to quickly find a rough estimate of the motion vector, and then refine the vector estimate by performing additional searches at finer level or levels of granularity. Examples of such hierarchical techniques include techniques that examine image blocks at different image resolutions (e.g., examine down-sampled image blocks, and then examine image blocks at higher and higher resolutions).

Other hierarchical techniques are step-size reducing techniques. One such technique is the four-step technique. This technique initially examines eight image blocks within the reference frame that are two pixels away from an image block that a predicted motion vector identifies in the reference frame. If any of the examined image blocks is a better match for the image block of the current frame, the four-step process sets the best matching image block as the current best image block. In its subsequent iteration or iterations, the four step process continues examining eight image blocks that are two pixels away from the current best image block until, in one iteration, the process determines that none of the surrounding image blocks is a better match for the current-frame image block than the current best image block. When the process determines that the current best image block is a better match than each of the image blocks that are two pixels away from the current best image block, the process examines eight image blocks that are one pixel away from the current best image block in the reference frame. The process then defines the matching image block as the image block that this last examination identified as the best matching one.

Existing motion estimation techniques often statically solve each motion estimation problem in the same manner. For instance, the initial motion vector can identify an initial image block that may be, or may be close to, an acceptable match for the current-frame image block. Alternatively, the initial motion-vector might identify an initial image block that is far from an acceptable match. However, in both these situations, prior motion estimation techniques typically perform the same motion estimation operations irrespective of the quality of the initial motion estimation. Therefore, there is a need in the art for an adaptive motion estimation technique that treats different motion estimation problems differently.

SUMMARY OF THE INVENTION

Some embodiments of the invention provide a method of performing motion estimation for an array of image values obtained from a current image. The method starts with an initial estimate of the motion of the current image. The method then determines whether the initial estimate of the motion of the current image array between the current image and a reference image is acceptable. If not, the method specifies a first value for a parameter for performing the motion estimation. Otherwise, the method specifies a second value for the parameter. The method then performs a motion estimation operation based on the specified value of the parameter. One example of a specified parameter is the size of the window that the motion estimation operation uses. Another example is the starting level for a hierarchical motion estimation operation that it performs. A hierarchical motion estimation operation searches the reference frame at several different levels of granularity.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Several embodiments of the invention will now be described by reference to FIGS. 1–7. Some of the embodiments described below use a hierarchical motion estimation approach. One of ordinary skill, however, will realize that many aspects of the invention can be used with other motion estimation techniques. Also, several embodiments described below try to estimate the motion of an array of image values that are obtained from a current frame by searching for matching arrays of image values that are obtained from a reference frame. In some embodiments, the image array values are two-dimensional arrays of luminance values. For instance, in some embodiments, the image arrays are 16-by-16, 8-by-8, or 4-by-4 blocks of luminance values. In MPEG encoding, it is common to perform motion estimation for 16-by-16 blocks, which are typically called macroblocks.

Each position in an image array obtained from a current frame or a reference frame might correspond to a particular pixel in its corresponding current or reference frame. In such a case, each pixel value in the array is the color-component (e.g., luminance) value of its corresponding pixel. Alternatively, each position in an image array might not correspond to a particular pixel in its frame, but rather might represent the color-component value of several adjacent pixels. Hence, this document states that the image arrays "are obtained" from the current frame or the reference frame to cover both the case where there is a one-to-one correspondence between the color values and the pixels in the frames, and the cases where there is no such one-to-one correspondence.

Figure 1:
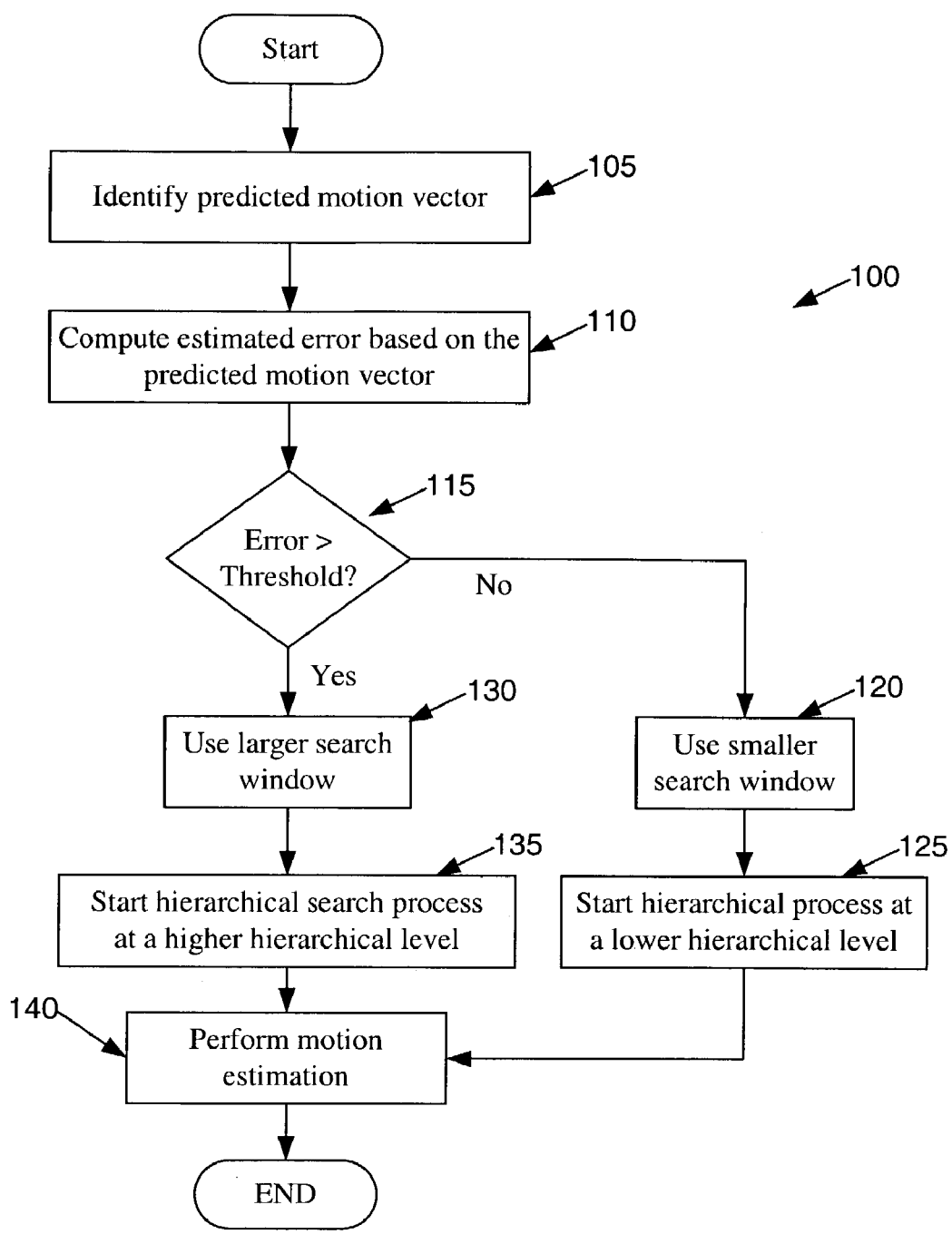
FIG. 1 illustrates a process that dynamically sets motion-estimation parameters based on the estimated accuracy of a predicted motion vector.

FIG. 1 illustrates a process 100 that a motion estimator uses to dynamically set motion-estimation parameters based on the estimated accuracy of a predicted motion vector. This process initially identifies (at 105) a predicted motion vector. Some embodiments identify the predicted motion vector by first initializing this vector for a first image array of the current frame. Different embodiments initialize the predicted motion vector for the first image array differently. For instance, some embodiments set this predicted motion vector to zero, while others set this vector to the vector of the image array in a previous image that corresponds to the first image array.

Figure 2:
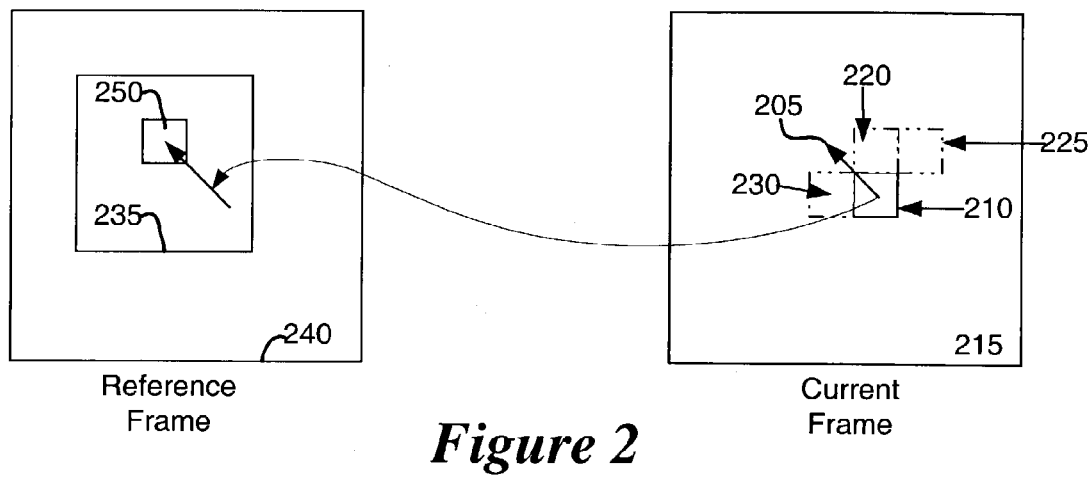
FIG. 2 illustrates one manner for specifying a predicted motion vector for the process of FIG. 1.

For each particular subsequent image array of the current frame, these embodiments then set this vector based on the predicted vectors of the image arrays that surround the particular image array. FIG. 2 illustrates one such manner for specifying the predicted vectors. Specifically, this figure illustrates the predicted motion vector 205 of an array 210 in a current frame 215. This predicted motion vector is computed as the median of the motion vectors of arrays 220, 225, and 230. These three arrays are adjacent to array 210, and the motion estimator previously specified their motion vectors.

FIG. 2 also illustrates the use of a motion vector to perform a motion estimation search. Specifically, it illustrates that once the predicted motion vector 205 is specified for the array 210, a hierarchical search is performed within a search window 235 in the reference frame 240. This search is for an array that closely resembles the array 210. As shown in this figure, this search starts at the location 250 specified by the predicted motion vector 205.

After 105, the process 100 computes (at 110) an estimated error based on the predicted motion vector. Different embodiments use different error metrics to quantify the estimated error. Some embodiments use the mean absolute difference ("MAD") metric. This metric quantifies the error in the following manner:

$$MAD = \frac{1}{N_p} \sum_i |x_i - y_i|. \quad (1)$$

In the above equation (1), the summation of the absolute value terms equals the difference between pixel values $x_i$ of the current-frame array with pixel values $y_i$ of the reference-frame array that was identified by the predicted motion vector, which was identified at 105. Also, $N_p$ is the number of pixels in the current-frame array, and i is a variable from 1 to $N_p$.

Next, the process determines (at 115) whether the estimated error is greater than a threshold value. If so, the process specifies (at 130) a large search window and sets (at 135) the starting hierarchical level of the motion estimation search to a higher hierarchical level, before performing a motion estimation operation at 140. Otherwise, when the estimated error is not greater than the threshold value, the process specifies (at 120) a smaller search window and sets (at 125) the starting hierarchical level of the motion estimation search to a lower hierarchical level, before performing the motion estimation operation at 140.

Figure 3:
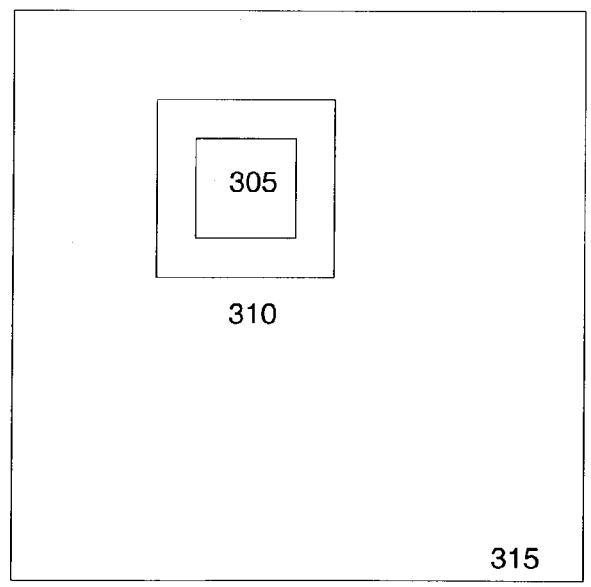
FIG. 3 illustrates two different search windows and that can be used to search for a matching block in a reference frame.
Figure 4:
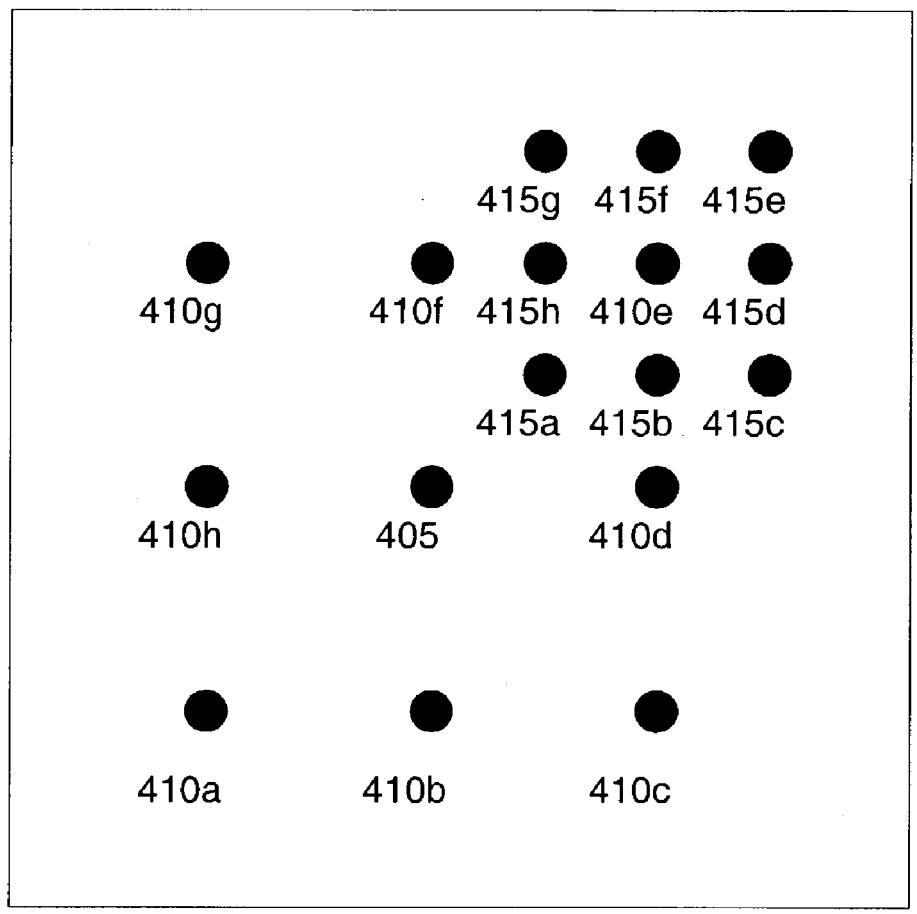
FIG. 4 illustrates one type of hierarchical motion-estimation search.

FIGS. 3 and 4 provide examples of search window and hierarchical levels that can be specified by the process 100 at 120, 125, 130, and 135. Specifically, FIG. 3 illustrates two different search windows 305 and 310 that can be used to search for a matching array in a reference frame 315. In some instances, the reference frame is the frame before the current frame, but this does not necessarily have to be the case. When the error computed (at 115) by the process 100 is small, it can be assumed that an accurate match can be found close to the location specified by the predicted motion vector. In this case, a small search window is used so that the motion estimation finishes quickly while returning an accurate vector. If the error estimated at 115 is large, a bigger search window is used, since it can not be assumed that an accurate match can be found close to the location specified by the predicted vector. The larger search window increases the chance that the motion estimator will find an acceptable match. However, searching the larger space may take a significantly longer time.

FIG. 3 shows the large and small search windows to be centered about the same point, which, in some embodiments, is the location of the center of the array (e.g., macroblock) in the current frame. In other embodiments, the smaller search window is centered about the predicted location. However, in some of these embodiments, this search window would never extend beyond the large search window. In other words, the small search window would be clipped by the larger one.

FIG. 4 illustrates one type of hierarchical motion-estimation search. This search starts by comparing the current-frame array with several different reference-frame arrays that are located (e.g., have their center or a vertex) (1) at a location 405 that is specified by the predicted motion vector and (2) at location 410a–410h that neighbors the location 405. The neighboring locations 410a–410h are a particular distance (referred to as the "step-size") away from the predicted location 405. For instance, in FIG. 4, the distance between locations 410a–410h and location 405 is 8 pixels.

To compare the current-frame array with a reference-frame array, some embodiments generate a difference metric score, e.g., generate a score according to the above-mentioned MAD metric. These embodiments then identify the reference-frame array with the best difference metric score. These embodiments then perform a finer search about the identified array. For instance, in the example illustrated in FIG. 4, the reference-frame array located at 410e has the best difference metric cost after the first iteration. Accordingly, after examining locations 410a–410h that are 8 pixels away from the predicted location 405, the search process examines locations 415a–415h that are four pixels away from location 410e. This hierarchical process can continue until the step size equals 1 (i.e., until the analyzed pixel locations are separated by 1 pixel). The location with the best difference metric score at the final hierarchical level is then selected as one end (e.g., the destination) of the motion vector. The other end (e.g., the source) of the motion vector is the location (e.g., location-defining center or vertex) of the current-frame array.

When the error computed (at 115) by the process 100 is small, then it is assumed that the location for the best matching reference-frame array lies close to the predicted motion vector. Hence, for the hierarchical process illustrated in FIG. 4, the process 100 sets (at 125) the initial step size to a lower value (e.g., four or two as opposed to 8) since a fine granularity search around the predicted motion vector will likely be sufficient. However, if the error estimated at 115 is large, the process 100 sets (at 135) the initial step size to a higher value (e.g., eight) since the best matching reference-frame is probably far from the predicted motion vector, and the larger step size increases the chance that the motion estimator will find an acceptable match. However, starting with the larger step size increases the search time.

Figure 5:
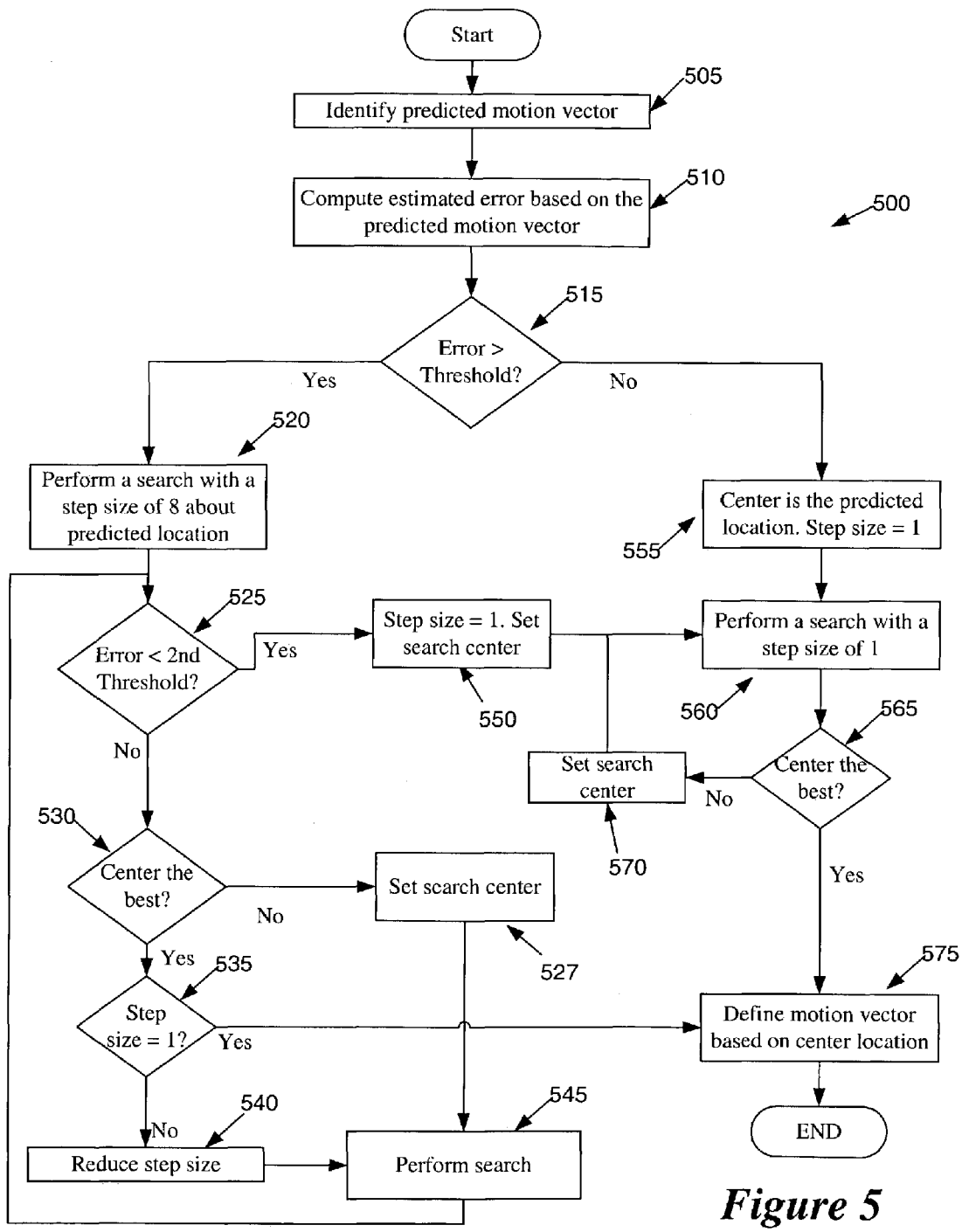
FIG. 5 illustrates an adaptive, hierarchical motion-estimation process of some embodiments of the invention.

FIG. 5 illustrates an adaptive, hierarchical motion-estimation process 500 of some embodiments of the invention. This process is a modification of the four-step process that was described in the background. This process initially identifies (at 505) a predicted motion vector. One manner for identifying a predicted motion vector was described above by reference to FIG. 2. After 505, the process 500 computes (at 510) an estimated error based on the predicted motion vector. One manner for computing such an error was described above by reference to equation (1).

Next, the process determines (at 515) whether the estimated error is greater than a threshold value. If so, the process specifies (at 520) the step size as 8. At 520, the process then compares the current-frame array with several different reference-frame arrays that are located (e.g., have their center or a vertex) (1) at a search-center location (e.g., 405 in FIG. 4) that is specified by the predicted motion vector and (2) at locations (e.g., 410a–410h in FIG. 4) that are 8 pixels away from the search center location (e.g., 405 in FIG. 4). As mentioned above, some embodiments compare the current-frame array with a reference-frame array by generating a difference metric score, such as an MAD metric. These embodiments then identify the reference-frame array with the best difference metric score.

At 525, the process then determines whether the best difference metric score is less than a second threshold. This second threshold is different than the threshold used at 515 in some embodiments, while it is equal to this threshold in other embodiments. If the difference is less than the second threshold, the process sets (at 550) the step size to 1, and defines the search-center location as the location with the best difference metric score in the last search. It then transitions to 560, which is further described below.

If the process determines (at 525) that the best difference metric score in the last search (which, in this loop, might have been performed at 520 as described above, or at 545 as described below) is not less than the second threshold, it determines (at 530) whether the current center of the search provided the best difference metric score. If not, the process defines (at 527) the current search center as the examined location that provided the best difference metric score in the last search. From 527, the process transitions to 545, which is further described below.

If the process determines (at 530) that the current search center provided the best difference metric score, the process determines (at 535) whether the step size equals 1. If the step size is 1, the process then transitions to 575, which is further described below. If the step size is not 1, the process reduces (at 540) the step size. In some embodiments, the process reduces the step size by dividing the current step size by 2. From 540, the process transitions to 545. The process also transitions to 545 from 527.

At 545, the process performs a search about the current search center. This search entails comparing the current-frame array with several different reference-frame arrays that are located (e.g., have their center or a vertex) (1) at the current search-center location and (2) at locations that are the current step size away from the search center location. Some embodiments compare (at 545) the current-frame array with a reference-frame array by generating a difference metric score. These embodiments then identify (at 545) the reference-frame array with the best difference metric score. From 545, the process transitions to 525, which was described above.

If the process determines (at 515) that the estimated error computed at 510 is less than or equal to the first threshold, the process sets (at 555) the search center as the predicted location. At 555, the process also sets the step size to 1. From 555, the process transitions to 560. As mentioned above, the process also transitions to 560 from 550.

At 560, the process performs a search about the current search center. This search entails comparing the current-frame array with several different reference-frame arrays that are located (e.g., have their center or a vertex) (1) at the current search-center location and (2) at locations that are 1 pixel away from the search center location. Some embodiments compare (at 560) the current-frame array with a reference-frame array by generating a difference metric score. These embodiments then identify (at 560) the reference-frame array with the best difference metric score.

After 560, the process determines (at 565) whether the current search center provided the best metric score identified at 560. If not, the process sets (at 570) the search center to the examined location that provided the best difference metric score in the last search. It then transitions back to 560, which was described above.

If the process determines (at 565) that the current search center provided the best difference metric score at 560, the process transitions to 575. As mentioned above, the process also transitions to 575 from 535. At 575, the process defines the motion vector based on the current search center. After 575, the process ends.

Figure 6:
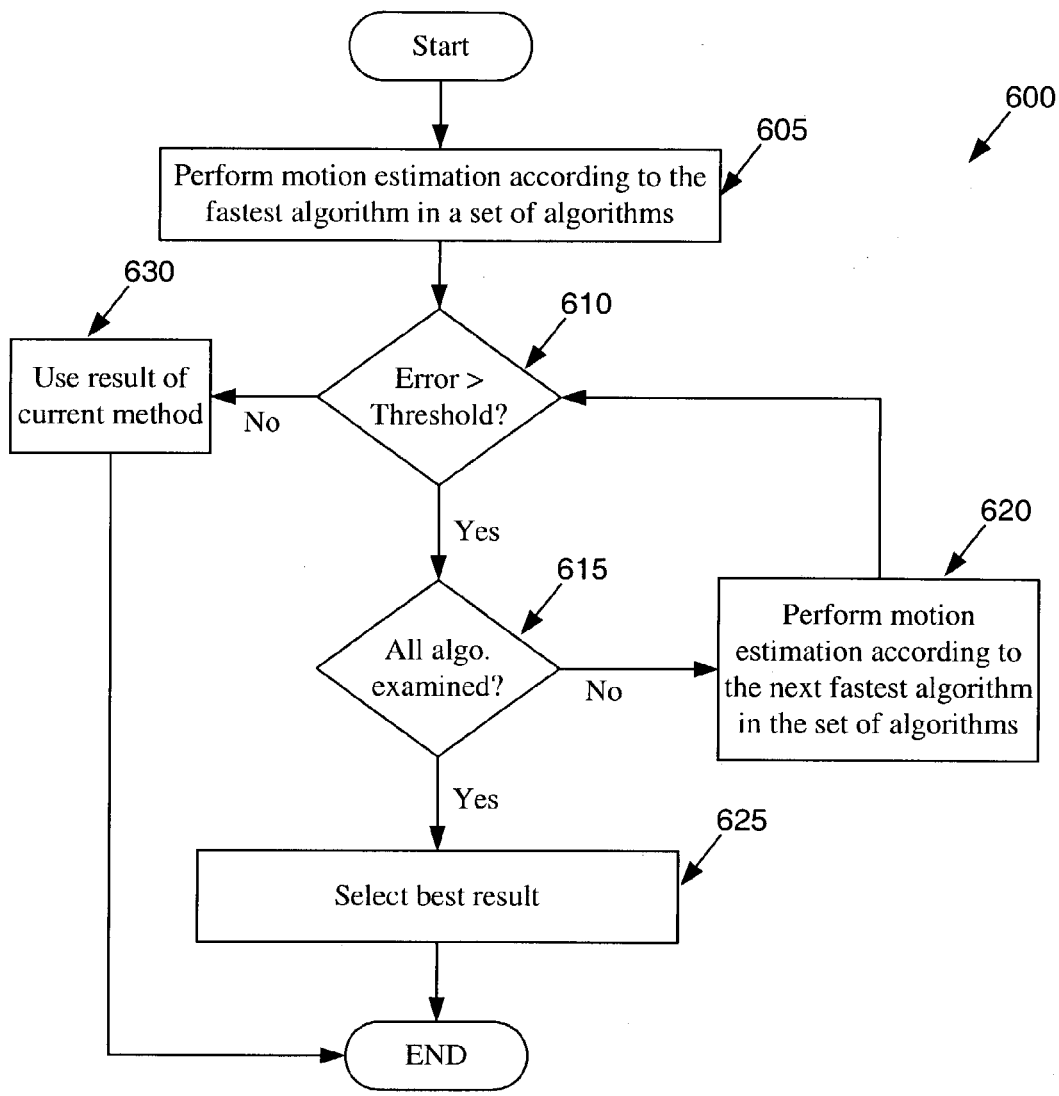
FIG. 6 illustrates a process used by some embodiments of the invention.

FIG. 6 illustrates a process 600 used by some embodiments of the invention. This process can dynamically examine different motion-estimation techniques in order to identify one technique that produces an acceptable result. Some embodiments perform this process to try to identify a motion vector for each current-frame array. Before this process starts, some embodiments specify a list that identifies different motion estimation techniques in a sorted order from the expected fastest to the expected slowest. Several examples of motion estimation techniques were described above by reference to FIGS. 1–5. An example of a list of motion estimation techniques includes the following three searches in the order that they are listed: a conventional "three-step search", the modified-four-step search of FIG. 5, and a conventional "full search".

The process 600 initially performs (at 605) the fastest motion estimation operation on the specified list. In some embodiments, each motion estimation operation on the list provides a motion vector and an estimated error. The motion vector specifies how much a current-frame array has moved since it appeared in the reference frame. Each motion estimator identifies this motion vector by searching for an array in the reference frame that most closely matches the current-frame array. It identifies the best reference-frame array that it encounters during its search and uses this reference-frame array to specify the motion vector.

The estimated error generated by a motion estimator quantifies the difference between the current-frame array and the best reference-frame array that it encountered during its search. Different embodiments use different error metrics to quantify the estimated error. Some embodiments use the mean absolute difference ("MAD") metric, which was described above by reference to equation (1).

Next, the process determines (at 610) whether the estimated error is greater than a threshold value. If so, the process determines (at 615) whether it has examined all the motion estimation operations that are specified on the sorted list. When it has not examined all these operation, the process performs (at 620) the next fastest motion estimation operation and transitions back to 610, which was described above. If the subsequent motion estimation operation (at 620) needs a predicted motion vector to start, the process 600 in some embodiments uses the motion vector of the previous motion estimation operation.

If the process determines (at 615) that it has examined all motion estimation operations without finding one that produced an acceptable result, the process selects the motion vector of the best result (i.e., the result that had the smallest estimated error) as the output of the motion estimation stage, and then ends.

On the other hand, if the process determines (at 610) that the estimated error of a particular motion estimation operation is not greater than a threshold, it selects (at 630) the motion vector of the particular motion estimation operation as the output of the motion estimation stage, and then ends. By sorting the motion estimation operations in a descending order based on their speed, the process 600 ensures that it finds an acceptable result in the fastest possible way.

Figure 7:
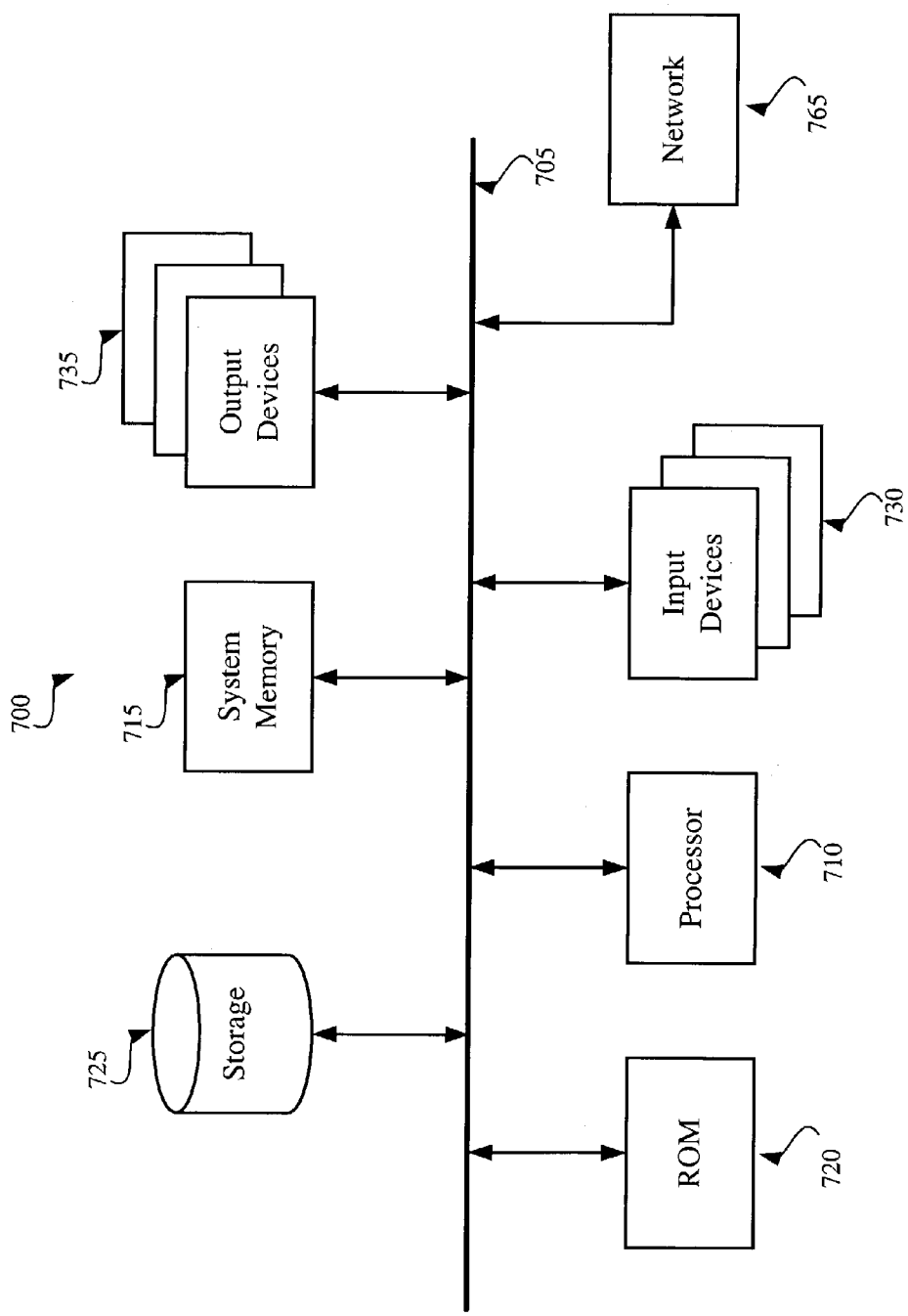
FIG. 7 presents a computer system with which one embodiment of the invention is implemented.

FIG. 7 presents a computer system with which one embodiment of the invention is implemented. Computer system 700 includes a bus 705, a processor 710, a system memory 715, a read-only memory 720, a permanent storage device 725, input devices 730, and output devices 735. The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725.

From these various memory units, the processor 710 retrieves instructions to execute and data to process in order to execute the processes of the invention. The read-only-memory (ROM) 720 stores static data and instructions that are needed by the processor 710 and other modules of the computer system. The permanent storage device 725, on the other hand, is read-and-write memory device. This device is a non-volatile memory unit that stores instruction and data even when the computer system 700 is off. Some embodiments of the invention use a mass-storage device (such as a magnetic or optical disk and its corresponding disk drive) as the permanent storage device 725.

Other embodiments use a removable storage device (such as a floppy disk or zip® disk, and its corresponding disk drive) as the permanent storage device. Like the permanent storage device 725, the system memory 715 is a read-and-write memory device. However, unlike storage device 725, the system memory is a volatile read-and-write memory, such as a random access memory. The system memory stores some of the instructions and data that the processor needs at runtime. In some embodiments, the invention's processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keyboards and cursor-controllers. The output devices 735 display images generated by the computer system. For instance, these devices display IC design layouts. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet) or a network of networks (such as the Internet). Any or all of the components of computer system 700 may be used in conjunction with the invention. However, one of ordinary skill in the art would appreciate that any other system configuration may also be used in conjunction with the present invention.

The adaptive motion estimation processes that were described above have several advantages. For instance, unlike existing motion estimation techniques that statically solve each motion estimation problem in the same manner, these motion estimation processes of the invention treat different motion estimation problems differently. The process 100 of FIG. 1, for example, dynamically sets the motion estimation parameters at the start of the motion estimation search based on the quality of the initial motion estimation. The process 500 of FIG. 5 similarly sets the motion estimation parameters at the start of its operations. In this manner, both the processes 100 and 500 speed up their motion estimation operations when their initial motion estimations are close to being acceptable. The process 600 of FIG. 6 is also intended to speed up the motion estimation process by sorting the motion estimation techniques in a descending order based on their speed, and examining successive techniques until one produces an acceptable solution.

While the invention has been described with reference to numerous specific details, one of ordinary skill in the art will recognize that the invention can be embodied in other specific forms without departing from the spirit of the invention. For instance, although the process 100 selects between only two different search windows and two different initial step sizes, other embodiments might select among three or more different search windows and/or step sizes. Also, some embodiments might only adaptively select the search window or the step size, but not both.

The process 100 was described above by reference to the step-size reducing motion estimation process of FIG. 4. This process could just as well been described by reference to another hierarchical motion-estimation operation, such as an operation that examines image arrays at different image resolutions (e.g., examine down-sampled image arrays, and then examines image arrays at higher and higher resolutions). In such a case, the process 100 of FIG. 1 might start the motion estimation on a coarser resolution level when it detects (at 115) that the computed error exceeds the threshold, or it might start the motion estimation at a lower finer resolution level when it detects (at 115) that the computed error does not exceed the threshold.

Also, as the estimated error increases, some embodiments might adaptively select different reference frames to examine (i.e., the embodiments might adaptively search across time). In addition, even though hierarchical motion-estimation searches were described above, other embodiments might utilize other motion-estimation searches. Furthermore, the process 500 starts using a step size of 1 when it determines (at 515) that the predicted array's error is less than a threshold. Other embodiments, however, might not reduce the step size to 1 in this situation. For instance, some might reduce the step size to 2 or 4, in order to allow the hierarchical search to perform a coarser search about the predicted location. Thus, one of ordinary skill in the art would understand that the invention is not to be limited by the foregoing illustrative details, but rather is to be defined by the appended claims.

We claim:

1. A method of performing a hierarchical motion estimation for an array of image values obtained from a current image, the hierarchical motion estimation operation specifying a hierarchical progression of searches at different resolutions in a reference image, wherein the hierarchical progression starts from coarser resolutions to finer resolutions, wherein the method starts with an initial estimate of the motion of the current image, the method comprising:
    a) determining whether the initial estimate of the motion of the current image array between the current image and a reference image is acceptable;
    b) specifying a first value for a first resolution parameter for performing the hierarchical motion estimation operation when the initial estimate is not acceptable, said first resolution parameter specifying a starting resolution value in the hierarchical progression;
    c) specifying a second value for the first resolution parameter for performing the hierarchical motion estimation operation when the initial estimate is acceptable, wherein the second resolution value is different from the first resolution value;
    d) performing the hierarchical motion estimation operation based on the specified value for the first resolution parameter.

2. The method of claim 1, wherein the hierarchical operation is an iterative operation that at each iteration searches the reference image to identify an image array in the reference image that better matches the current-image array than a current best-matching image array in the reference image.

3. The method of claim 2, wherein each search in the hierarchical operation comprises:
    a) identifying several image arrays that are a particular step size away from a current best-matching image array in the reference image;
    b) determining whether any of the identified image arrays is a better match for the current-image array than the current best-matching image array;
    c) if any of the identified image arrays is a better match for the current-image array than the current best-matching image array, specifying the current best-matching image array as the identified image array that most closely matches the current-image array.

4. The method of claim 3,
    wherein the first parameter relates to the step size,
    wherein when a search at a particular iteration determines that none of the identified image arrays is a better match for the current-image array than the current best-matching array, the hierarchical operation selects the next step size specified in the hierarchical progression unless the particular step size was at the last level of progression,
    wherein the first and second values specify two different step sizes in the hierarchical progression.

5. The method of claim 1 further comprising identifying a predicted motion vector to identify the initial estimation of the motion.

6. The method of claim 5, wherein identifying a predicted motion vector comprises computing the predicted motion vector based on identified motion vectors of image arrays that neighbor the current image array, so long as the current image array is not the first image array in the current image that the method is processing for motion estimation.

7. The method of claim 5, wherein identifying a predicted motion vector comprises specifying the predicted motion vector as a predetermined initial value when the current image array is the first image array in the current image that the method is processing for motion estimation.

8. The method of claim 5,
    wherein determining whether the initial estimate of the motion is acceptable comprises:
        a) using the predicted motion vector to obtain an image array from a reference image;
        b) quantifying the difference between the current-image array and the reference-image array;
        c) determining whether the quantified difference is less than a particular threshold;
    wherein when the quantified difference is less than the particular threshold, specifying the first value for the first parameter,
    wherein when the quantified difference is greater than the particular threshold, specifying the second value for the first parameter.

9. The method of claim 8 further comprising specifying the first value for the first parameter when the quantified difference is equal to a particular threshold.

10. The method of claim 8 further comprising specifying the second value for the first parameter when the quantified difference is equal to a particular threshold.

11. The method of claim 1 further comprising:
    a) specifying a first value for a second parameter for performing the motion estimation when the initial estimate is not acceptable;
    b) specifying a second value for the second parameter for performing the motion estimation when the initial estimate is acceptable;
    c) performing a motion estimation operation based on the second parameter, said second parameter having the first value when the initial estimate is not acceptable and said second parameter having the second value when the initial estimate is acceptable.

12. The method of claim 11,
    wherein the second parameter is the size of a window in the reference image that the motion estimation operation will search, and the first and second values are first and second sizes for the window, wherein the first value specifies a size that is larger than the size specified by the second values,
    wherein the motion estimation operation is a hierarchical operation that performs several different sets of searches in the reference image, wherein the hierarchical operation follows a hierarchical progression of values for the second parameter used to perform the searches, wherein each particular set of searches is based on one of the particular values specified in the hierarchical progression, wherein the first and second values specify two different values in the hierarchical progression that are to serve as starting values for the hierarchical operation.

13. A method of performing a hierarchical motion estimation for an array of image values obtained from a current image the hierarchical motion estimation operation specifying a hierarchical progression of searches at different resolutions in a reference image, wherein the hierarchical progression starts from coarser resolutions to finer resolutions, the method comprising:
   a) identifying a predicted motion vector;
   b) using the predicted motion vector to obtain an image array from a reference image;
   c) quantifying the difference between the current-image array and the reference-image array;
   d) specifying a first value for a first resolution parameter for performing the hierarchical motion estimation operation when the quantified difference is less than a particular threshold, said first resolution parameter specifying a starting resolution value in the hierarchical progression;
   e) specifying a second value for the first resolution parameter for performing the hierarchical motion estimation operation when the quantified difference is greater than the particular threshold, wherein the second resolution value is different from the first resolution value;
   f) performing the hierarchical motion estimation operation based on the specified value for the first resolution parameter.

14. A method of hierarchically performing motion estimation for a current-image array in a current image, wherein the method uses a hierarchical progression including a first, second, and third step sizes, wherein the first step size is greater than the second step size, wherein the second step size is greater than the third step size, the method comprising:
   a) identifying a current best image array in a reference image;
   b) selecting the first step size in the hierarchical progression;
   c) identifying several image arrays that are the first step size away from the current best-matching image array in the reference image;
   d) if a difference between a particular one of the identified image arrays and the current-image array is less than a particular threshold,
      specifying the particular identified image array as the current best matching image array,
      selecting the third step size in the hierarchical progression,
      identifying several image arrays that are the third step size away from the current best-matching image array in the reference image.

15. The method of claim 14, wherein the hierarchical progression specifies step sizes of 8, 4, 2, and 1, and the first step size is 8 while the third step size is either 2 or 1.

16. The method of claim 14, wherein identifying the current best-matching image array comprises using a predicted motion vector to identify the current best-matching image array from a reference image.

17. A computer readable medium storing a computer program, the computer program for performing motion estimation for an array of image values obtained from a current image, wherein the computer program starts with an initial estimate of the motion of the current image, the computer program comprising sets of instructions for:
   a) determining whether the initial estimate of the motion of the current image array between the current image and a reference image is acceptable;
   b) specifying a first value for a first parameter, said first value specifying a size of a window in a reference image that a motion estimation operation will search when the initial estimate is not acceptable;
   c) specifying a second value for the first parameter, said second value specifying a size of a window in a reference image that the motion estimation operation will search when the initial estimate is acceptable, said second value specifying a size of a window that is smaller than the first value;
   d) performing the motion estimation operation based on the first parameter, said first parameter having the first value when the initial estimate is not acceptable and said first parameter having the second value when the initial estimate is acceptable.

18. The computer readable medium of claim 17, wherein the motion estimation operation is a hierarchical operation that specifies a hierarchical progression of values for the first parameter and that performs at least two sets of searches for two of the values specified in the hierarchical progression.

19. The computer readable medium of claim 18, wherein the first and second values specify different starting values in the hierarchical progression.

20. A computer readable medium storing a computer program, the computer program for performing motion estimation for an array of image values obtained from a current image, the computer program comprising sets of instructions for:
   a) identifying a predicted motion vector;
   b) using the predicted motion vector to obtain an image array from a reference image;
   c) quantifying the difference between the current-image array and the reference-image array;
   d) specifying a first value for a first parameter, said first value specifying a size of a window in a reference image that a motion estimation operation will search when the quantified difference falls within a range defined by a particular threshold;
   e) specifying a second value for the first parameter, said second value specifying a size of a window in a reference image that the motion estimation operation will search when the quantified difference does not fall within the range defined by the particular threshold, said second value specifying a size of a window that is larger than the first value;
   f) performing the motion estimation operation based on the first parameter, said first parameter having the first value when the quantified difference falls within the range defined by the particular threshold and said first parameter having the second value when the quantified difference does not fall within the range defined by the particular threshold.

21. A computer readable medium storing a computer program, the computer program for performing motion estimation for a current-image array in a current image, wherein the computer program uses a hierarchical progression including a first, second, and third step sizes, wherein the first step size is greater than the second step, wherein the second step size is greater than the third step size, the computer program comprising sets of instructions for:
   a) identifying a current best image array in a reference image;
   b) selecting the first step size in the hierarchical progression;
   c) identifying several image arrays that are the first step size away from the current best-matching image array in the reference image;

d) if a difference between a particular one of the identified image arrays and the current-image array falls within a range defined by a particular threshold,
specifying the particular identified image array as the current best matching image array,
selecting the third step size in the hierarchical progression,
identifying several image arrays that are the third step size away from the current best-matching image array in the reference image.

22. A method of performing a hierarchical motion estimation operation for an array of image values obtained from a current image the hierarchical motion estimation operation specifying a hierarchical progression of searches at different resolutions in a reference image, wherein the hierarchical progression starts from coarser resolutions to finer resolutions, the method comprising:
determining whether an initial estimate of the motion of the current image array between the current image and a reference image falls within a range defined by a threshold;
performing the hierarchical motion estimation operation based on a first resolution parameter specifying a starting resolution value in the hierarchical progression, said first resolution parameter having a first value when the initial estimate does not fall within the range defined by the threshold and said first resolution parameter having a second value when the initial estimate falls within the range defined by the threshold, wherein the second resolution value is different from the first resolution value.

23. The method of claim 16, wherein the hierarchical operation is an iterative operation that at each iteration searches the reference image to identify an image array in the reference image that better matches the current-image array than a current best-matching image array in the reference image.

24. The method of claim 23, wherein each search in the hierarchical operation comprises:
a) identifying several image arrays that are a particular step size away from a current best-matching image array in the reference image;
b) determining whether any of the identified image arrays is a better match for the current-image array than the current best-matching image array;
c) if any of the identified image arrays is a better match for the current-image array than the current best-matching image array, specifying the current best-matching image array as the identified image array that most closely matches the current-image array.

25. The method of claim 24,
wherein the first parameter relates to the step size,
wherein when a search at a particular iteration determines that none of the identified image arrays is a better match for the current-image array than the current best-matching array, the hierarchical operation selects the next step size specified in the hierarchical progression unless the particular step size was at the last level of progression,
wherein the first and second values specify two different step sizes in the hierarchical progression.

26. A computer readable medium storing a computer program, the computer program for performing a hierarchical motion estimation operation for an array of image values obtained from a current image, the hierarchical motion estimation operation specifying a hierarchical progression of searches at different resolutions in a reference image, wherein the hierarchical progression starts from coarser resolutions to finer resolutions, the computer program comprising sets of instructions for:
determining whether an initial estimate of the motion of the current image array between the current image and a reference image falls within a range defined by a threshold;
performing the hierarchical motion estimation operation based on a first resolution parameter specifying a starting resolution value in the hierarchical progression, said first resolution parameter having a first value when the initial estimate does not fall within the range defined by the threshold and said first resolution parameter having a second value when the initial estimate falls within the range defined by the threshold, wherein the second resolution value is different from the first resolution value.

27. The computer readable medium of claim 26, wherein the hierarchical operation is an iterative operation that at each iteration searches the reference image to identify an image array in the reference image that better matches the current-image array than a current best-matching image array in the reference image.

28. The computer readable medium of claim 27, wherein each search in the hierarchical operation comprises a set of instructions for:
a) identifying several image arrays that are a particular step size away from a current best-matching image array in the reference image;
b) determining whether any of the identified image arrays is a better match for the current-image array than the current best-matching image array;
c) if any of the identified image arrays is a better match for the current-image array than the current best-matching image array, specifying the current best-matching image array as the identified image array that most closely matches the current-image array.

29. The computer readable medium of claim 28,
wherein the first parameter relates to the step size,
wherein when a search at a particular iteration determines that none of the identified image arrays is a better match for the current-image array than the current best-matching array, the hierarchical operation selects the next step size specified in the hierarchical progression unless the particular step size was at the last level of progression,
wherein the first and second values specify two different step sizes in the hierarchical progression.

* * * * *